United States Patent [19]

Pirre, Jr. et al.

[11] 4,102,542
[45] Jul. 25, 1978

[54] RIDER PROPELLED VEHICLE

[75] Inventors: Frank A. Pirre, Jr., 40 Elmwood Ave., Norwalk, Conn. 06854; Andrew McGovern, Buckfield La., Greenwich, Conn. 06830

[73] Assignees: Frank A. Pirre, Jr., Norwalk; Andrew J. McGovern, Greenwich, both of Conn.; part interest to each

[21] Appl. No.: 702,351

[22] Filed: Jul. 2, 1976

[51] Int. Cl.² .............................................. B62K 1/00
[52] U.S. Cl. ...................................... 280/207; 180/10
[58] Field of Search .................. 180/10; 280/206, 207, 280/208

[56] References Cited
U.S. PATENT DOCUMENTS

| 325,548 | 9/1885 | Lose | 280/207 |
| 1,915,886 | 6/1933 | Gutierrez | 180/10 |
| 3,762,744 | 10/1973 | Sidlauskas | 280/207 |

Primary Examiner—Joseph F. Peters, Jr.
Assistant Examiner—Donn McGiehan

[57] ABSTRACT

A rider propelled vehicle, particularly designed for use by children as a toy, includes an outer-large diameter wheel having a seat frame located within its periphery. The frame is operatively connected to the outer wheel at two spaced points by an arrangement which permits the outer wheel to move through the frame and rotate about its own central axis. The seat frame includes a foot drive mechanism operatively engaged with the outer wheel forwardly of the center of rotation of the outer wheel for rotating the outer wheel upon operation of a foot pedal by a person on the seat frame. A pair of laterally spaced ground engageable steering wheels are rotatably mounted on the frame on opposite sides of the outer wheel rearwardly of the center of gravity of the frame and of the center of rotation of the outer wheel, thereby to resist undriven rearward rolling of the outer wheel and to permit the rider to steer the vehicle.

15 Claims, 3 Drawing Figures

RIDER PROPELLED VEHICLE

The present invention relates to rider propelled vehicles, and in particular to a vehicle adapted to be used by a child as a toy and consisting of a single large driven wheel arranged so that the operator may sit within the confines of the wheel.

Monoycles or velocipedes of the type having a single large ground engaging wheel which is driven either by the rider or by a motor located within the confines of the wheel have previously been proposed in a variety of types of configurations. Perhaps the simplest forms are shown in U.S. Pat. Nos. 481,070 Slocum and 1,189,909 to Bemis. Somewhat more sophisticated rider propelled velocipedes are shown in U.S. Pat. Nos. 422,089 to Melin and 1,316,408 to Babb; while powered vehicles of this type are shown in U.S. Pat. Nos. 2,107,766 to Rose and 3,260,324 to Suarez. As can be appreciated, each of these previously proposed vehicles is relatively difficult to ride and maneuver. They are primarily intended for use by an adult having a sophisticated sense of balance and rapid psychomoter abilities, in order to enable them to properly control forward and turning movements of the vehicles as well as vertical stability. Because these previously proposed devices are unwieldy and difficult to balance they are difficult, if not impossible, for a young child to use as a play vehicle.

In accordance with an aspect of the present invention a monocycle type toy vehicle is provided which is adapted to be propelled by a small child. The vehicle includes an outer relatively large diameter wheel having a peripheral rim and an open interior, within the confines of the rim. A seat frame is located within the periphery of the outer wheel and is operatively connected to the outer wheel at two spaced locations on the frame by a device which permits the outer wheel to move through the frame at these two spaced points.

A drive wheel is rotatably mounted on the seat frame in driving engagement with the rim of the outer wheel. This drive wheel is located forwardly of the center of gravity of the seat and of the center axis of the large outer wheel, and includes at least one foot pedal for operation by the rider of the toy vehicle to enable the rider to rotate the drive wheel and thus the outer wheel. Movement of the outer wheel along the support surface causes the frame to move with it.

The seat frame includes an idler wheel having a diameter smaller than that of the diameter of the drive wheel and it is rotatably mounted in the seat frame rearwardly of the drive wheel and of the center of gravity of the frame. This idler wheel is in driven engagement with the rim for rotation by the outer wheel and for the purpose of aiding in supporting the seat frame on the outer wheel. By this arrangement of the drive wheel and idler wheel the center of gravity of the seat frame is normally located rearwardly of the center of rotation of the outer wheel, thereby to resist undriven forward rolling of the outer wheel.

A pair of laterally spaced ground engageable steering wheels are rotatably mounted on the frame and are located on opposite sides of the outer wheel rearwardly of the idler wheel to support a substantial portion of the weight of the rider and frame directly on the ground. The seat frame includes a handlebar or the like to permit steering of these steering wheels. By locating the steering wheels in this manner undriven rearward rolling of the outer wheel is resisted, and lateral stability to the outer wheel is provided. Thus even a small child can easily sit on the seat frame within the large diameter outer wheel and propel the frame in either a forward or rearward direction.

The above, and other objects, features and advantages of this invention will be apparent in the following detailed description of an illustrative embodiment thereof, which is to be read in connection with the accompanying drawings, wherein.

Figure 1:
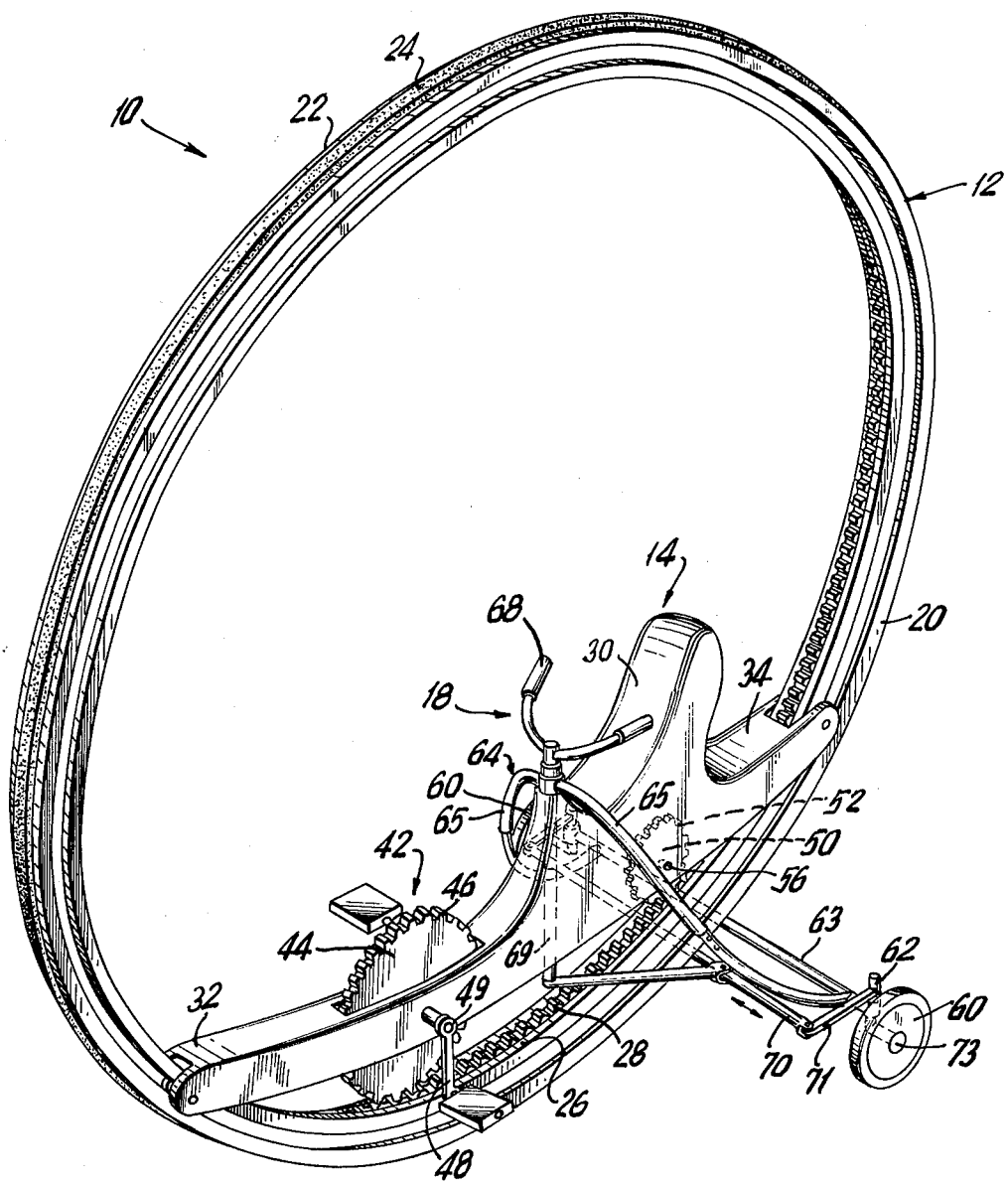
FIG. 1 is a perspective view of a toy vehicle constructed in accordance with the present invention.

Referring now to the drawing in detail, and initially to FIG. 1 thereof, it will be seen that the toy vehicle 10 of the present invention consists of a large outer wheel 12 and a seat frame 14 mounted on the wheel and permitting the wheel to pass therethrough, as described hereinafter.

Seat frame 14 is drivingly engaged with the outer wheel 12 so that the rider or operator seated on the frame can cause the outer wheel 12 to rotate along the surface on which it is supported in either a forward or rearward direction, thereby to propel the outer wheel, and thus himself, in the desired direction. The seat frame includes a steering mechanism 18 which permits the operator to control the direction of travel of the outer wheel 12 without the need for tilting or bodily shifting wheel 12 as it rotates along its path of travel.

Outer wheel 12 consists of a rim 20 which may be formed of molded or forged metal or molded or extruded plastic or the like. The rim has an outer peripheral surface which may be covered by a rubber tread or band 24 or the like for wear purposes. In the illustrated embodiment of the invention, the inner periphery 26 of rim 20 is formed with a plurality of gear teeth 28 thereon as an annular gear rack. These gear teeth cooperate with the drive of the seat frame 14 for the purpose of enabling the rider to propel the outer wheel 12 in the desired direction. In some cases it is contemplated that a smooth friction wheel drive on the frame may be preferred, in lieu of the illustrated gear drive.

Seat frame 14 can be formed in any convenient manner, as for example from a one-piece molded plastic construction or from two identical halves welded together by heat seal or the like in the conventional manner for manufacturing toy vehicles. The particular shape or outline configuration of the toy vehicle can be selected as desired, but preferably the frame has a seat 30 formed therein to accommodate the rider.

Seat frame 14 has opposite ends 32, 34 operatively connected to rim 20 of outer wheel 12. This connection is made by cooperating means on the rim and the seat frame, which consist of a pair of outwardly opening channels 36 (see FIG. 3) formed on opposite sides of rim 20 to respectively receive rollers 38 rotatably mounted in the ends 32, 34 of the seat frame. By this arrangement the frame is secured to rim 20 of two spaced points, at opposite ends of the frame, but wheel 12 is permitted to rotate through seat frame 14 at these two spaced points. Thus while wheel 12 rotates about its central axis 40, frame 14 will remain in a relatively fixed horizontal position but will move laterally along with the outer wheel. It is noted that because of the location of the drive wheel of the frame and the steering wheel, the weight of the rider and frame are not transmitted to the wheel 12 through roller 38. Thus the latter simply act as free turning guides.

In order to drive outer wheel 12, seat frame 14 is provided with a drive arrangement 42 which consists of a relatively large diameter wheel 44 (for example wheel 44 may have a diameter of 12 inches when the outer wheel 12 has a diameter of 6 feet) having gear teeth 46 formed on its outer periphery. These gear teeth are arranged to mesh with the gear teeth 28 on the internal periphery 26 of rim 20. (Where a friction drive is used wheel 44 will have a frictional surface on its periphery for cooperating with the inner surface of wheel 12).

Wheel 44 is rotatably mounted in frame 14 in any convenient manner, forwardly of the center of gravity of the seat frame. The gear wheel is rotated by a pair of foot pedals or cranks 48, which are rigidly secured in any convenient manner to the axle 49 of the gear drive wheel. By this arrangement it will be appreciated that rotation of the gear 44 by the rider of the vehicle will cause wheel 12 to similarly rotate.

In addition to gear wheel 44, seat frame 14 includes a second gear wheel 50 (also referred to hereinafter as an idler wheel) which has a smaller diameter than the gear wheel 44. Gear wheel 50 has a series of gear teeth 52 formed on its outer periphery for also engaging the gear teeth 28 of rim 20. Because of the relative location of the wheel 44 and the steering wheels, idler 50 transmits very little of the weight of the rider and frame to wheel 12 so that the vehicle is supported by gear wheel 44 and the steering wheels. And, as mentioned, grooves 36 and rollers 38 are designed simply to retain the frame on the rim of the wheel and not transmit any substantial portion of the weight of seat frame 14 to the wheel. This arrangement reduces the amount of friction in the vehicle.

In accordance with a feature of the present invention, idler wheel 50 has a diameter which is substantially smaller than the diameter of gear wheel 44 (for example where gear wheel 44 is a 12 inch diameter, gear wheel 50 has a diameter preferably equal to 4 inches) and it is located rearwardly of the center of gravity (indicated by reference numeral 54 in the drawing) of the seat frame 14 but with its axis of rotation 56 located at the same level as the axle 49 of gear wheel 44 (i.e. an imaginary chord 57 of wheel 12 will pass through the axles of gear wheels 44 and 50). By this arrangement the center of gravity 54 of the seat frame is normally maintained rearwardly of the central axis 40 of rotation of the wheel 12; and thus any tendency of wheel 12 to roll in a forward direction when gear 44 is not being driven is resisted by the weight of the seat frame.

Figures 2, 3:
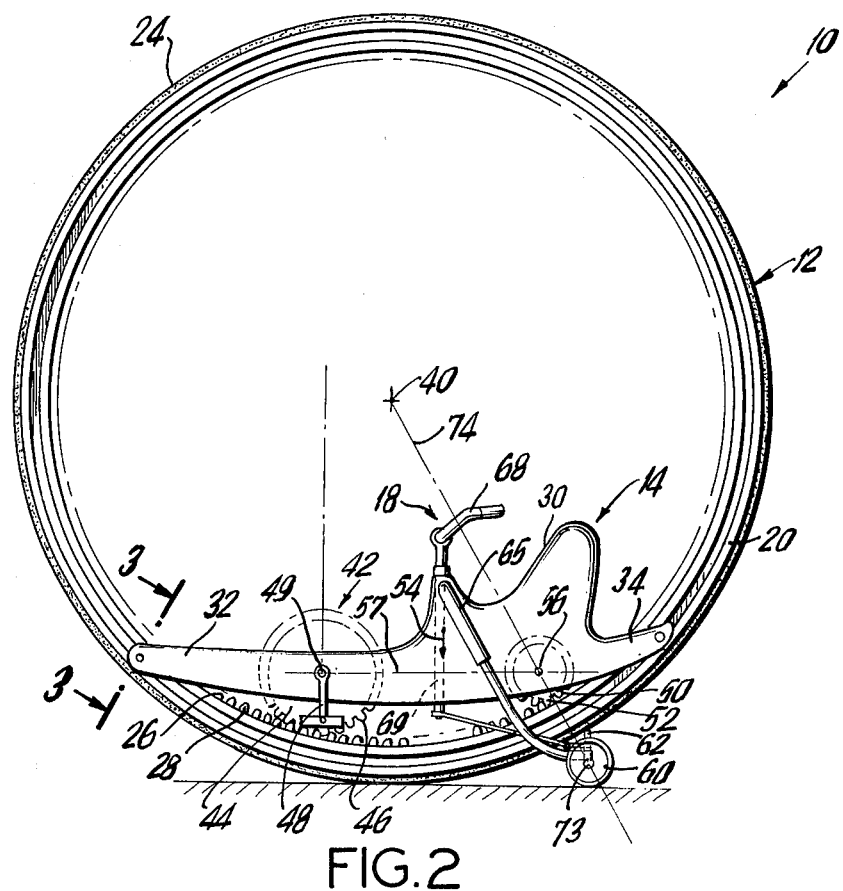
FIG. 2 is a side view of the vehicle illustrated in FIG. 1.
FIG. 3 is a sectional view taken along line 3—3 of FIG. 2.

In accordance with a further feature of the present invention rearward undriven rolling movement of wheel 12 is resisted, and the wheel itself can be steered, by a pair of steering wheels 60 (see FIGS. 1 and 2). These steering wheels are respectively rotatably mounted on vertical pivots 62 secured to a cross bar 63. This cross bar is rigidly secured to a yoke member 64 which is, in turn, rigidly secured to frame 14. The yoke has a pair of legs 65 which are adjustable in length. For example the legs can be formed as telescopic members connected by pins in any of a series of holes to permit their length to be adjusted. The length of these arms is adjusted to keep the axes of rotation of wheel 44 approximately two inches forward of the axis of rotation (40) of wheel 12. Thus the weight of the rider and frame (the major portion of which is transmitted to the ground through wheels 44) will tend to make wheel 12 rotate in a forward direction, making pedaling of the vehicle substantially easier.

A handlebar 68 is pivotally mounted on frame 14 and connected through a rotatable crank linkage 69 of conventional construction connected at its free end to a tie bar 70 that connects cranks 71 on pivots 62. In this manner rotation of the handlebars is transmitted to tie bar 70 and wheels 60 to turn the wheels simultaneously. This steering arrangement is similar to the steering linkage systems on automobiles and permits the vehicle to be steered so that the direction of movement of outer wheel 12 can be varied. It will be appreciated that a variety of types of steering arrangements can be used in lieu of the relatively simple steering mechanism disclosed herein.

Another feature of the present invention is that the steering wheels 60 are located in a predetermined position with respect to idler wheel 50. As seen in FIG. 2 wheels 60 are located slightly rearwardly of gear wheel 52, and the axis of rotation 73 of the steering wheels are located (when the device is traveling in a straightforward direction) so as to lie in substantially the same radial plane as the axis of rotation 56 of gear wheel 52, i.e. the center of rotation 40 of the wheel 12, the axis of rotation of the gear wheel 52, and the axis of rotation of the steering wheels 60 all lie on the same radial line 70. By this arrangement steering wheels 60 support the weight of the rider and frame directly on the ground and they will resist undriven rearward turning of wheel 12. By this is meant that steering wheels 60 will resist the tendency of wheel 12 to roll freely in a rearward direction when it is not driven. However, since idler wheel transmits little or no force to wheel 12 there is no rearwardly directed force applied to wheel 12 and the tendency of the wheel to roll backward is reduced. In addition the steering wheels provide lateral stability to the toy and eliminate the need for a great degree of balance on the part of the user.

Moroever, by locating the steering wheels in this manner, the axis of rotation of wheel 44 is kept forwardly of the center of rotation of wheel 12, The center of gravity of the toy vehicle is maintained rearwardly of the center of rotation of wheel 12, and the axes of rotation 49, 56 of the gear wheels 44, 52 respectively are maintained on a common horizontal plane so that the seat frame itself is maintained in a horizontal plane and does not tend to ride up either side of the wheel 12 out of horizontal alignment.

Steering wheels 60 may also be provided with a conventional bicycle type brake mechanism (for example the conventional clamping hand brake type arrangement) in order to permit the operator to brake or stop movement of the vehicle.

As mentioned, in lieu of gear wheels 44, 52 and the annular rack gear 28, it is contemplated that other drive arrangements can be utilized, such as for example a simple frictional engagement between the internal rim of the outer wheel and the wheels 44, 52. The engaging surfaces may be provided with a high friction rubber covering to permit a positive drive arrangement.

Although an illustrative embodiment of the present invention has been described herein with reference to the accompanying drawings, it is to be understood that the invention is not limited to that precise embodiment, but that various changes and modifications may be effected therein by one skilled in the art without departing from the scope or spirit of this invention.

What is claimed is:

1. A rider propelled vehicle comprising an outer, large diameter wheel, a seat frame located within the periphery of said outer wheel, means for operatively connecting said seat frame to said outer wheel at two spaced points on the frame and for permitting said outer wheel to move through said frame at said two spaced points, means on said frame, including at least one foot pedal, operatively engaged with said outer wheel for rotating said outer wheel upon operation of said foot pedal by a person seated on said frame; said rotating means including a drive wheel rotatably mounted on said seat frame for rotation upon actuation of the foot pedal and being drivingly engaged with said outer wheel; a pair of laterally spaced ground engageable steering wheels located to continuously engage the ground during operation of the vehicle rotatably mounted on said frame and located on opposite sides of said outer wheel rearwardly of the center of gravity of the frame and the center of rotation of the outer wheel; and rider operable means on said frame for steering said steering wheels; and a single idler wheel mounted on said seat frame rearwardly of said drive wheel and drivingly engaged with said outer wheel for rotation thereby upon rotation of the drive wheel; the axis of rotation of said drive wheel being located forwardly of the axis of rotation of said outer wheel; and the axis of rotation of said idler wheel being located rearwardly of the center of gravity of said seat frame; said drive wheel having a larger diameter than said idler wheel; and said drive wheel and idler wheel being substantially equidistant from the center of gravity of said seat frame; whereby the axis of rotation of said drive wheel is closer to the center of rotation of the outer wheel than the axis of rotation of the idler wheel and the center of gravity of the seat frame is located rearwardly of the center of rotation of the outer wheel to resist forward undriven rolling of said outer wheel.

2. A rider propelled vehicle comprising an outer large diameter wheel, a seat frame located within the periphery of said outer wheel, means for operatively connecting said seat frame to said outer wheel at two spaced points on the frame and for permitting said outer wheel to move through said frame at said two spaced points, means on said frame, including at least one foot pedal, operatively engaged with said outer wheel for rotating said outer wheel upon operation of said foot pedal by a person seated on said frame; said rotating means including a drive wheel rotatably mounted on said seat frame for rotation upon actuation of the foot pedal and being drivingly engaged with said outer wheel; a pair of laterally spaced ground engageable steering wheels rotatably mounted on said frame and located on opposite sides of said outer wheel rearwardly of the center of gravity of the frame and the center of rotation of the outer wheel; rider operable means on said frame for steering said steering wheel; and an idler wheel mounted on said seat frame rearwardly of said drive wheel and drivingly engaged with said outer wheel for rotation thereby upon rotation of the drive wheel; the axis of rotation of said drive wheel being located forwardly of the axis of rotation of said outer wheel and said idler wheel being located rearwardly of the center of gravity of said seat frame; said drive wheel having a larger diameter than said idler wheel and said steering wheels being located rearwardly of said idler wheel to resist rearward undriven rolling of said outer wheel; the axes of rotation of said idler wheel and of said steering wheels being located in a common radial plane extending from the axis of rotation of the outer wheel.

3. A vehicle as defined in claim 2 wherein said idler wheel and said steering wheels have the same diameter.

4. A rider propelled vehicle comprising an outer, large diameter wheel, a seat frame located within the periphery of said outer wheel, means for operatively connecting said seat frame to said outer wheel at two spaced points on the frame and for permitting said outer wheel to move through said frame at said two spaced points, means on said frame, including at least one foot pedal, operatively engaged with said outer wheel for rotating said outer wheel upon operation of said foot pedal by a person seated on said frame; said rotating means including a drive wheel rotatably mounted on said frame for rotation upon actuation of the foot pedal and being drivingly engaged with said outer wheel; a pair of laterally spaced ground engageable steering wheels rotatably mounted on said frame and located on opposite of said outer wheel rearwardly of the center of gravity of the frame and the center of rotation of the outer wheel; rider operable means on said frame for steering said steering wheels; and an idler wheel mounted on said seat frame rearwardly of said drive wheel and drivingly engaged with said outer wheel for rotation thereby upon rotation of the drive wheel; the axis of rotation of said drive wheel being located forwardly of the axis of rotation of said outer wheel and said idler wheel being located rearwardly of the center of gravity of said seat frame; the axes of rotation of said idler wheel and of said steering wheels being located in a common radial plane extending from the axis of rotation of the outer wheel; said idler wheel and steering wheels having the same diameter.

5. A vehicle as defined in claim 4 wherein said drive wheel has a larger diameter than said idler wheel whereby the center of gravity of the seat frame is located rearwardly of the center of rotation of the outer wheels to resist forward undriven rolling of said outer wheel.

6. A vehicle as defined in claim 5 wherein said steering wheels are located rearwardly of said idler wheel to resist rearward undriven rolling of said outer wheel.

7. A vehicle as defined in claim 4 including means for adjusting the position of said steering wheels with respect to said frame.

8. A rider propelled vehicle comprising an outer, larger diameter wheel having a peripheral rim and an open interior portion; a seat frame located within the periphery of said outer wheel in the interior portion thereof; cooperating means on said frame and rim for operatively connecting said seat frame to said outer wheel at two longitudinally spaced points on the frame and for permitting said outer wheel to move through said frame at said spaced points; a drive wheel rotatably mounted on said seat frame and drivingly engaged with said outer wheel, said drive wheel being located forwardly of the axis of rotation of said outer wheel and the center of gravity of said seat frame and including at least one foot pedal for operation by the rider of the vehicle to rotate the drive wheel and thus the outer wheel; an idler wheel having a diameter smaller than the diameter of said drive wheel rotatably mounted in the seat frame rearwardly of the drive wheel and center of gravity of the seat frame in driving engagement with said rim for rotation by the outer wheel whereby the center of gravity of the seat frame is normally located rearwardly of the center of rotation of the outer wheel to resist undriven forward rolling of the outer wheel; a pair of laterally spaced ground engageable steering wheels rotatably mounted on said frame and located on opposite sides of said outer wheel rearwardly of said idler wheel, thereby to resist undriven rearward rolling of said outer wheel; and rider operable means on said frame for steering said wheels to guide movement of said outer wheels; and wherein the axes of rotation of said idler wheel and of said steering wheels are located in a common radial plane extending from the axis of rotation of the outer wheel.

9. A vehicle as defined in claim 8 wherein said idler wheel and said steering wheels have the same diameter.

10. A vehicle as defined in claim 8 wherein said cooperating means comprises a pair of annular outwardly opening channels formed on opposite sides of said rim and two pairs of opposed rollers rotatably mounted on said seat frame at said two points, with the rollers of each pair respectively received in the channels on opposite sides of said rim.

11. A vehicle as defined in claim 8 wherein said drive wheel comprises a gear rotatably mounted in said frame to lie in the same plane as said outer wheel and said outer wheel includes an annular gear ring formed on the interior of said rim for drivingly engaging said gear-drive wheel.

12. A vehicle as defined in claim 8 wherein said seat frame includes a bifurcated yoke member rotatably mounted thereon for rotation about a normally vertical axis and including a pair of legs respectively located on opposite sides of said outer wheel and extending rearwardly of said vertical axis to free ends on which said steering wheels are respectively rotatably mounted; said rider operable means including handlebars operatively connected to said yoke.

13. A rider propelled vehicle comprising an outer, large diameter wheel, a seat frame located within the periphery of said outer wheel, means for operatively connecting said seat frame to said outer wheel at two spaced points on the frame and for permitting said outer wheel to move through said frame at said two spaced points, a drive wheel rotatably mounted on said seat frame in driving engagement with said outer wheel and including a foot pedal whereby operation of said foot pedal by a person seated on said frame causes said outer wheel to rotate; a single idler wheel of smaller diameter than said drive wheel mounted on said seat frame rearwardly of said drive wheel and drivingly engaged with said outer wheel; and a pair of laterally spaced ground engaging wheels rotatably mounted on said seat frame and located to continuously engage the ground during operation of the vehicle, said ground engaging wheels being located to maintain the axis of rotation of said drive wheel forwardly of the axis of rotation of the outer wheel and to support a portion of the weight of the subframe directly on the ground while the rest of the weight of the seat frame is supported on the ground by said outer wheel with substantially all of said weight being transmitted to said outer wheel through said drive wheel whereby a substantially greater amount of weight of the rider and frame is applied to the outer wheel forwardly of the axis of rotation of the outer wheel by the drive wheel than is applied to the outer wheel rearwardly of the axis of rotation of the outer wheel by the idler wheel, facilitating operation of said foot pedal to drive the vehicle in a forward direction.

14. The vehicle as defined in claim 13 wherein said ground engaging wheels are steerable.

15. The vehicle as defined in claim 13 including means for adjusting the position of said ground engaging wheels with respect to said frame.

* * * * *